United States Patent [19]

Hasui et al.

[11] Patent Number: 4,579,247
[45] Date of Patent: Apr. 1, 1986

[54] CAP FOR FUEL TANK

[75] Inventors: Hiroshi Hasui, Tokyo; Hidetoshi Ogida, Fukushima; Akira Kitsukawa, Ayase, all of Japan

[73] Assignee: Nihon Radiator Co., Ltd., Tokyo, Japan

[21] Appl. No.: 509,405

[22] Filed: Jun. 30, 1983

[30] Foreign Application Priority Data

Jul. 5, 1982 [JP] Japan .................. 57-101917[U]
Jul. 26, 1982 [JP] Japan .................. 57-113131[U]

[51] Int. Cl.$^4$ ............................................ B65D 41/04
[52] U.S. Cl. .......................... 220/288; 220/DIG. 33; 215/215
[58] Field of Search ............... 220/288, 201, 203, 281, 220/367, DIG. 32, DIG. 33; 215/201, 215

[56] References Cited

U.S. PATENT DOCUMENTS

| | | | |
|---|---|---|---|
| 3,777,924 | 12/1973 | Kayser et al. ................... | 215/215 |
| 4,091,955 | 5/1978 | Sloan, Sr. ...................... | 220/288 X |
| 4,142,756 | 3/1979 | Henning et al. ................ | 220/DIG. 33 X |
| 4,228,915 | 10/1980 | Hooper et al. .................. | 220/288 |
| 4,252,246 | 2/1981 | Johnson et al. ................. | 220/288 X |
| 4,299,102 | 11/1981 | Aro ................................ | 220/DIG. 33 X |
| 4,360,122 | 11/1982 | Sullivan ......................... | 220/DIG. 33 X |

FOREIGN PATENT DOCUMENTS

2307205  8/1974  Fed. Rep. of Germany ...... 215/215

*Primary Examiner*—Steven M. Pollard
*Attorney, Agent, or Firm*—Kalish & Gilster

[57] ABSTRACT

A cap for a fuel tank has a cap body for screwing into the filler neck of the fuel tank with an "O" ring interposed therebetween, and a lid member for mating to the cap body, both the lid member and the cap body having coacting structure for mutual interengagement to maintain the lid member normally mated to the cap body but separable in break-away relationship from the cap body to leave the cap body intact within the filler neck upon application of external force, such as through collision, to the lid member. The coacting structure may take the form of engaging recesses, holes or grooves on one member and of engaging projections, tabs or pins on the other member.

5 Claims, 16 Drawing Figures

CAP FOR FUEL TANK

BACKGROUND AND SUMMARY OF THE INVENTION

The present invention relates to a cap for fuel tanks of vehicles and, more particularly, to a cap for fuel tanks constructed to avoid the leak of fuel out of the tank in the event of a collision of the vehicle.

A known cap for fuel tank having a function to prevent the leak of fuel in the event of a collision involves a groove or fragile portion formed in the portion thereof intermediate between the cap body and the lid member. When an extraordinary external force is exerted on the lid member, the fragile portion is broken to permit the cap member to be separated from the cap body, so that the cap body remains in the filler neck of the tank to prevent any leak of the fuel out of the tank. This type of cap is shown, for example, in Japanese Patent Laid-Open No. 55950/1980, Japanese Utility Model Publication No. 18288/1982 and U.S. Pat. No. 4,177,931. In this conventional cap, however, there is no means to assure the breakage of the cap at the fragile portion for leaving only the cap body in the filler neck, and it has been often experienced that the cap body itself is broken to permit the leak of fuel.

The present invention aims as its primary object at providing a cap for fuel tanks, improved to ensure an easy separation of the lid member to leave the cap body intact in the filler neck of the tank without fail, thereby to prevent leak of fuel from the fuel tank.

To this end, according to the invention, there is provided a cap for a fuel tank comprising: a cap body screwed into the filler neck of the fuel tank with an "O" ring interposed therebetween, the cap body having an upper flange provided with a plurality of engaging grooves or engaging holes or engaging tabs; and a lid member provided in the lower side thereof with a plurality of engaging tabs or engaging grooves or engaging holes; whereby said lid member is attached to said cap body through the mutual engagement between the engaging projections and the engaging recesses.

Alternatively, the cap body may have its upper flange provided with a plurality of engaging recesses or engaging projections formed in the inner surface or outer surface of the wall thereof; the lid member having a slitted sleeve projecting from the lower side thereof and provided with a plurality of engaging projections or engaging recesses formed in the outer surface or the inner surface of the sleeve; whereby the lid member is attached to the cap body through the mutual engagement between the engaging projections and the engaging recesses. The recesses are preferrably shaped to permit the lid member to slip relative to the cap member in one direction, as on tightening, but not in the other direction, as on loosening.

In any event, the lid member normally remains mated to the cap body but is separable from the cap body to leave the cap body intact within the filler neck upon application of external force to the lid member, such as, through collision.

DESCRIPTION OF THE PREFERRED EMBODIMENT

Figure 1:
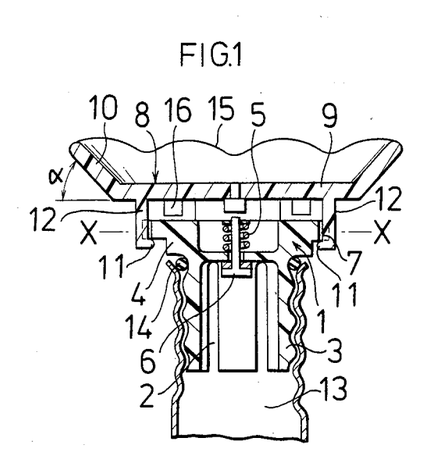
FIG. 1 is a sectional view of a cap for fuel tank in accordance with the invention.

With reference to the accompanying drawing, FIG. 1 shows a cap for fuel tank in accordance with an embodiment of the invention in which engaging grooves to be engaged by the engaging tabs are formed in the outer surface of an upper flange.

Figure 2:
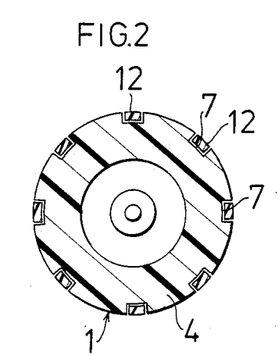
FIG. 2 is a sectional view of a cap body taken along the line X—X of FIG. 1.

The cap body 1 is formed of a plastic material and is thereby resiliently deformable. The cap 1 is provided at its lower portion with a sleeve 3 having a lower threaded portion 2 and at its upper portion with an upper flange 4. The cap body 1 is provided therein with a vacuum valve 6 incorporating a vacuum spring 5. A plurality of engaging grooves 7 are formed at a constant pitch in the outer wall surface of the upper flange 4, as shown in FIG. 2.

On the other hand, the lid member 8 is provided at its upper portion with a saucer-shaped lid flange 9 the side wall 10 of which is inclined at a suitable angle α to the horizontal plane, e.g., an angle which is greater than 0° but smaller than 90°. The lid member 8 is provided at its lower side with a plurality of engaging tabs 12 having small inner projections 11 corresponding to the engaging grooves 7 in the cap body 1. The arrangement is such that the lid member 8 is fitted in the cap body 1 through mutual engagement between the engaging tabs 12 on the lid member 8 and the engaging grooves 7 formed in the upper flange 4 of the cap body 1. The cap body 1 in turn is screwed at its threaded portion 2 to the filler neck 13 of the tank through an "O" ring 14.

In order to facilitate the gripping of the cap body 1 during attaching of the same to the filler neck 13, the side wall 10 of the lid flange 9 is undulated as at 15. In addition, a stopper 16 is formed on the lower side of the lid member 8 to make the vertical positioning of the engaging grooves 7 and the engaging tabs 12.

Figure 3:
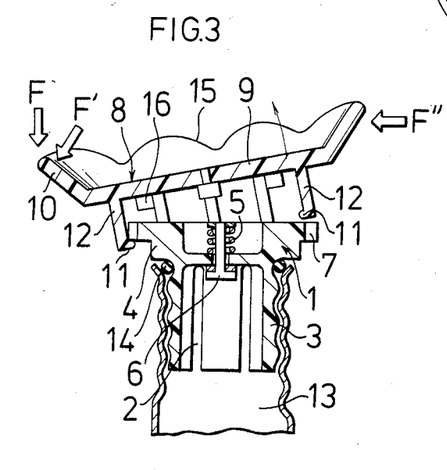
FIG. 3 is a sectional view of a cap for a fuel tank as shown in FIG. 1, with the lid member detached therefrom.

In the event that an external force is applied to the lid member 8 due to a collision, the engaging tabs 12 are disengaged from the engaging grooves 7 to permit the lid member 8 to be separated easily from the cap body 1, so that the cap body 1 is left intact without fail in the filler neck 13 of the fuel tank 1 thereby to prevent any leak of fuel from the fuel tank. The lid member 8 is provided with the saucer-shaped lid flange 9 having a side wall 10 which is inclined at a suitable angle α, so that it can easily be detached from the cap body by the force applied in any direction, i.e. by application of upward, obliquely upward and lateral forces F, F′ and F″, while leaving the cap body 1 in the filler neck 13 of the tank without fail. It is, therefore, possible to prevent any leak of fuel out of the tank and, hence, secondary accident due to fire. The cap body 1 and the lid member 8 are formed easily by die-casting or by injection molding at a low cost, and the assembling is facilitated due to the reduced number of parts. The angle α of inclination of the side wall 9 of the lid member 7 preferably ranges between 30° and 45° to permit an easy separation of the lid member 7 by the force applied in any direction.

Figure 4:
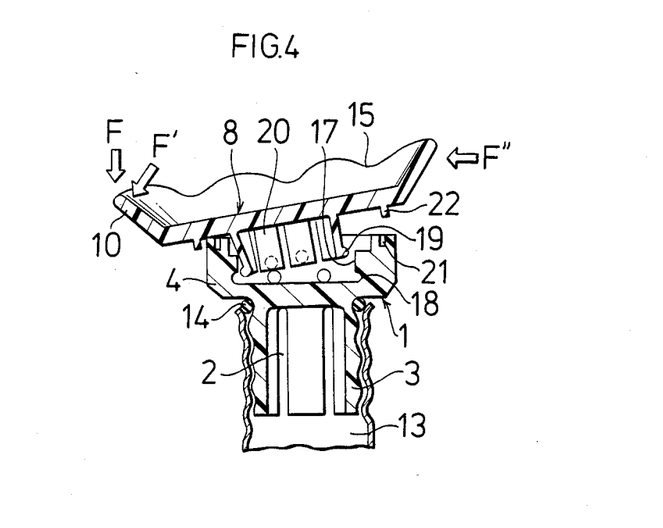
FIGS. 4 and 5 are sectional views of different embodiments of the cap for fuel tank with the lid member thereof detached therefrom.

FIG. 4 shows another embodiment of the fuel tank cap of the invention in which the engaging holes to be engaged by the engaging tabs are formed in the inner surface of a recess formed in the upper flange.

In this embodiment, a large recess 17 is formed in the upper flange 4 of the cap body 1 and a plurality of spherical engaging holes 18 are formed at a constant pitch in the inner surface of the recess 17. At the same time, a plurality of engaging tabs 20 having spherical engaging projections 19 tantamount to pins and corresponding to the engaging holes 18 are formed at a constant pitch in the lower side of the lid member 8. The lid member 8 is attached to the cap body 1 through mutual engagement between the engaging tabs 20 and the engaging holes 18 formed in the surface of the recess 17. The cap body 1 in turn is screwed at its lower threaded portion into the filler neck 13 of the tank through an "O" ring interposed therebetween so as to be fixed to the filler neck 13 of the tank. In this embodiment, it is necessary to provide a mounting hole 21 in the upper flange 4 while forming a mounting projection 22 on the lid member 8 thereby to effect a torque transmission between the lid member 8 and the cap body 1.

Figure 5:
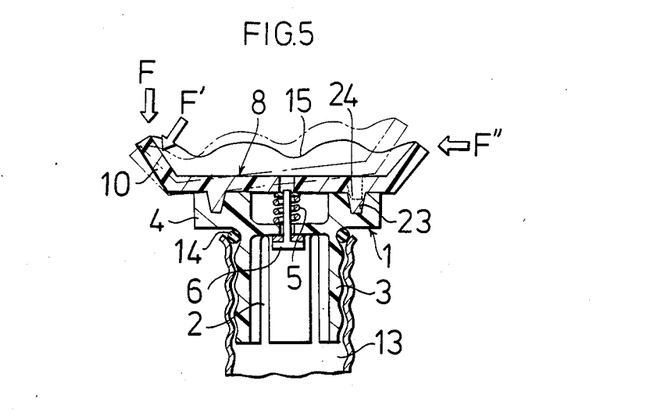

FIG. 5 shows still another embodiment of the fuel tank cap of the invention in which the engaging holes to be engaged by the engaging tabs are formed in an intermediate portion of the upper flange.

In this embodiment, a wedge-shaped engaging hole 23 is formed in an intermediate portion of the upper flange 4 of the cap body 1, while a plurality of wedge-shaped engaging tabs 24 of the same sectional shape as the engaging hole 23 are formed at a constant pitch in the lower side of the lid member 8. The lid member 8 is secured to the cap body 1 through a tight engagement between the engaging tabs 24 and the engaging hole 23.

In both of the embodiments of the fuel tank cap shown in FIGS. 4 and 5, only the lid member 8 is separated in the event of a collision so that the cap body 1 is left in the filler neck 13 to prevent the leak of the fuel, the cap body being intact.

The embodiments described hereinbefore is provided or not provided with the vacuum valve 6 in the cap body 1. The invention, however, can be applied to a fuel tank having both a vacuum valve and a pressurizing valve.

Although in the described embodiments the engaging grooves or engaging holes are formed in the cap body while the engaging tabs are provided on the lid member, it will be apparent that this relation may be reversed.

As has been described, the invention provides a fuel tank cap having a cap body adapted to be screwed into a filler neck of the fuel tank and provided with a plurality of engaging grooves or engaging holes or engaging tabs, and a lid member provided with corresponding mutually coacting engaging tabs or engaging grooves or engaging holes, respectively, so that the lid member can be attached to the cap body. Therefore, in the event of a collision, the lid member is easily separated by the external force to leave the cap body in the sound state in the filler neck of the tank to prevent the leak of fuel, thereby to avoid the secondary accident due to fire without fail.

Figures 6, 7:
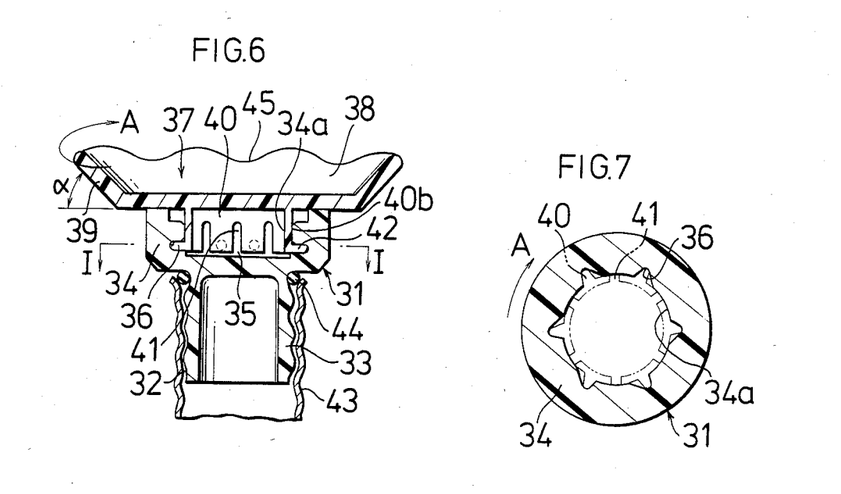
FIG. 6 is a sectional view of a cap for fuel tank in accordance with the invention.
FIG. 7 is a sectional view of a cap body taken along the line I—I of FIG. 6.

FIG. 6 is a cap for a fuel tank constructed in accordance with another embodiment of the invention.

The cap body 31 is a cylindrical member made of plastic material, being thereby resiliently deformable. The cap 31 is provided at its lower portion with a sleeve 33 having a lower threaded portion 32 and at its upper portion with an upper flange 34 having a large recess 35 formed in the upper part thereof. A plurality of engaging recesses 36 are formed at a constant pitch in the inner wall 34a of the upper flange 34 having the recess 35. As will be seen from FIG. 7, the engaging recesses 36 have deformed shape of laterally elongated grooves to permit an easy slip in the direction A of tightening of the lid member 37.

On the other hand, the lid member 37 is made of a plastic and is provided at its upper portion with a lid flange 38 the side wall 39 of which is inclined at a suitable angle α to the horizontal plane, e.g., an angle which is greater than 0° but smaller than 90°. The lid member 37 is provided at its lower side with a sleeve 40 sized to fit in the recess 35 and having slits 41. Engaging projections 40b in the form of circular rods or pins are formed at a constant pitch on the outer surface of the sleeve 40. The arrangement is such that the lid member 37 is fitted in the cap body 31 through mutual engagement between the engaging projections 42 on the lid member 37 and the engaging recesses 36 formed in the inner wall 34a of the upper flange 34 of the cap body 31. The cap body 31 in turn is screwed at its threaded portion 32 to the filler neck 43 of the tank through an "O" ring 44. The engaging recesses 36 formed in the cap body 31 are shaped to permit an easy slip in the direction A of tightening of the lid member 37. More specifically, the arrangement is such that, as a tightening torque in excess of a predetermined torque is applied to the screwing portion of the cap, the engaging projections 42 on the lid member 37 are smoothly slided into next engaging recesses 36 in the cap body 31 so that the cap body 31 is fastened to the filler neck 43 always at a constant clamping force. In order to facilitate the gripping of the cap body 31 during attaching of the same to the filler neck 43, the side wall 39 of the lid flange 38 is undulated as at 45.

Figure 8:
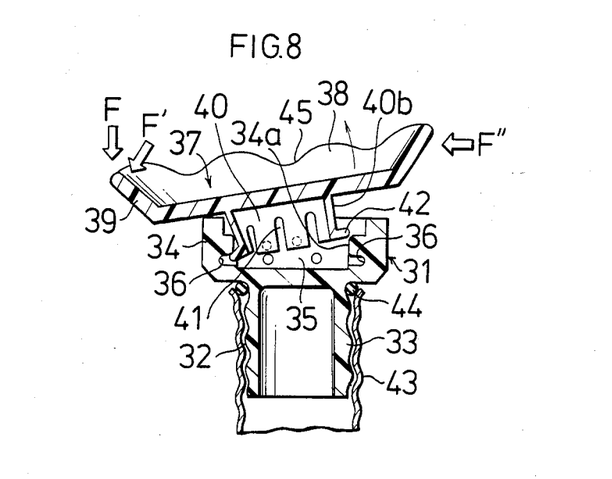
FIG. 8 is a sectional view of a cap for a fuel tank as shown in FIG. 6, with the lid member detached therefrom.

In the event that an external force is applied to the lid member 37 due to, for example, a collision, the engaging projections 42 are disengaged from the engaging recesses 36 to permit the lid member 37 to be separated easily from the cap body 31, so that the cap body 31 in the sound state is left without fail in the filler neck 43 thereby to prevent any leak of fuel from the fuel tank. The lid 37 is provided with the saucer-shaped lid flange 38 having a side wall 39 which is inclined at a suitable angle α, so that it can easily be detached from the cap body by the force applied in any direction, i.e., by application of upward, obliquely upward and lateral forces F, F' and F", while leaving the cap body 31 intact in the filler neck 43 of the tank without fail. It is, therefore, possible to prevent any leak of fuel out of the tank and, hence, secondary accident due to fire. The angle α of inclination of the side wall 39 of the lid member 37 preferably ranges between 30° and 45° to permit an easy separation of the lid member 37 by the force applied in any direction.

Figure 9:
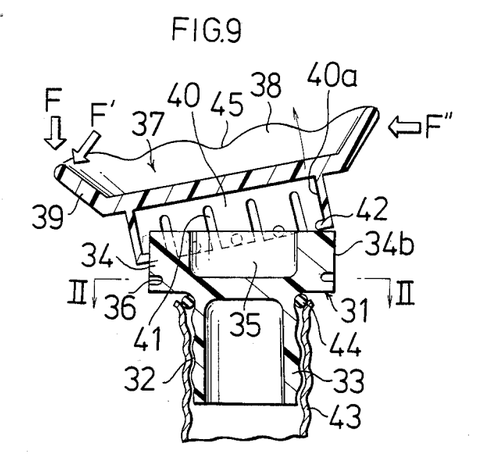
FIG. 9 is a sectional view of another embodiment of the cap for fuel tank with the lid member thereof detached therefrom.

FIG. 9 shows another embodiment of the fuel cap in accordance with the invention.

Figure 10:
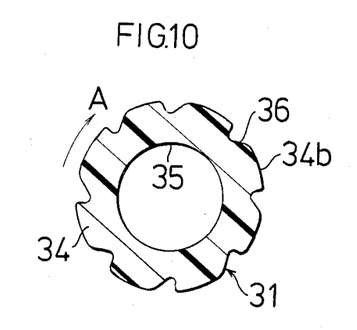
FIG. 10 is a sectional view taken along the line II—II of FIG. 9.

In this embodiment, the engaging recesses in the form of laterally elongated grooves in the cap body 31 are formed in the outer wall surface 34b of the upper flange 34 as shown in FIG. 10, while the engaging pins or projections 42 on the lid member 37 are formed on the inner wall surface 40a of the sleeve 40 having the slits 41.

When a large force is exerted on the cap due to, for example, a collision, the engaging projections are disengaged from the engaging recesses 36 to permit an easy separation of the lid member 37 to leave only the cap body in the filler neck 43 of the fuel tank to prevent any secondary accident or fire due to leak of the fuel remaining in the fuel tank.

In the embodiments described hereinbefore, the engaging recesses 36 are formed in the cap body 31 while the engaging projections 42 are provided on the lid member 37. This arrangement, however, may be reversed. Namely, it is possible to provide the engaging projections on the cap body while forming the engaging recess in the lid member. Although the described embodiment is devoid of any pressure regulating valve mechanism such as vacuum valve provided in the cap body 31, it is preferred to provide such a pressure regulating mechanism to permit the adjustment of the internal pressure of the fuel tank.

As has been described, according to the invention, there is provided a cap for a fuel tank comprising: a cap body screwed into the filler neck of the fuel tank, the cap body having an upper flange provided with a plurality of engaging recesses or engaging projections, i.e., pins, formed in the inner surface or outer surface of the wall thereof; and a lid member having a slitted sleeve projected from the lower side thereof and provided with a plurality of corresponding coacting engaging projections or engaging recesses, respectively, formed in the outer surface or the inner surface of the sleeve; whereby the lid member is attached to the cap body through the mutual coacting engagement between the engaging projections and the engaging recesses.

Therefore, even when a large force is applied to the cap member due to, for example, accident, the lid member is separated without fail to leave intact only the cap body within the filler neck of the fuel tank to ensure the prevention of the leak of the fuel out of the tank and, hence, any secondary accident such as fire thereby to ensure the safety of the fuel tank.

Figure 11:
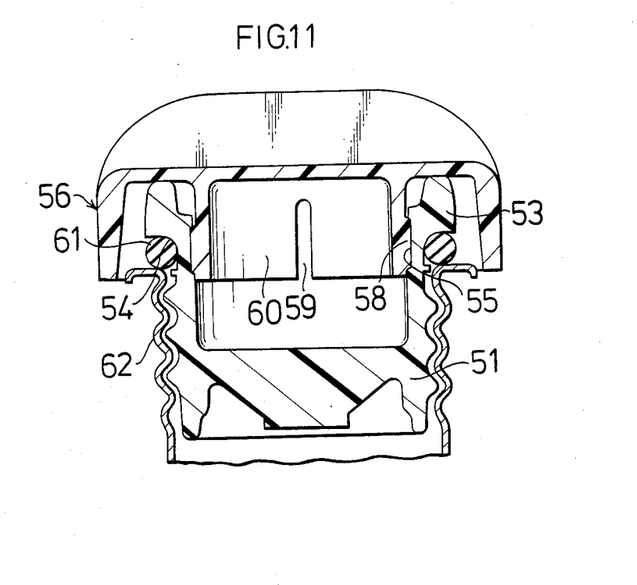
FIG. 11 is a sectional view of an essential part of a fuel tank cap in accordance with an embodiment of the invention.

FIG. 11 is a cap for a fuel tank constructed in accordance with another embodiment of the invention.

Figure 12:
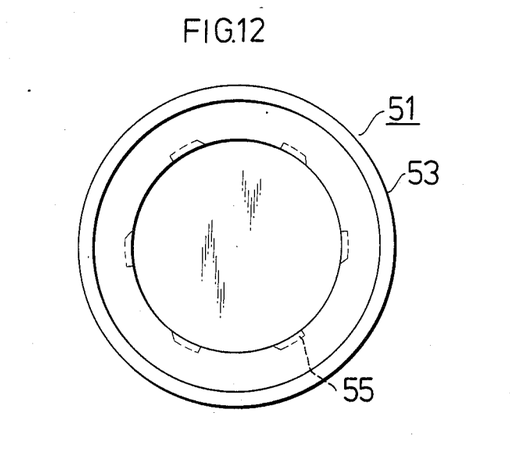
FIG. 12 is a plan view of a cap body as shown in FIG. 11.
Figure 13:
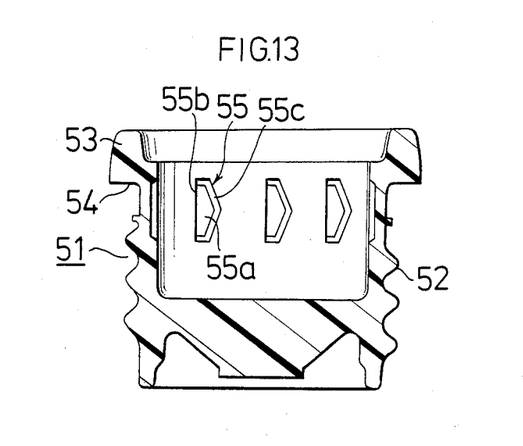
FIG. 13 is a sectional view of a cap body as shown in FIG. 11.

The cap body 51 is a cylindrical member made of a plastic and provided therein with a suitable valve mechanism (not shown). The cap body 51 is adapted to be screwed to the filler neck 62 of a fuel tank at a peripheral screw thread 52 formed in the outer peripheral surface thereof. A flange 53 is formed above the screw thread 52 to extend radially outwardly from the cylindrical main portion of the cap body 51, forming a jaw 54 between the flange 53 and the screw thread 52. An "O" ring is retained by the jaw 54. A plurality of pentagonal recesses 55 are formed in the inner peripheral surface of the cap body 51 at a constant circumferential pitch. To attain a smooth slipping in the direction A for tightening a lid member 56, the recesses 55 are orientated such that apices of the triangular sections are directed in the direction of slipping movement. Tapered surfaces 55c are formed between the wall of the cap body 51 and the triangular sections 55a. The rear ends of the recesses 55 are constituted by edges 55 which protrudes perpendicularly with respect to the cap body 51.

Figure 14:
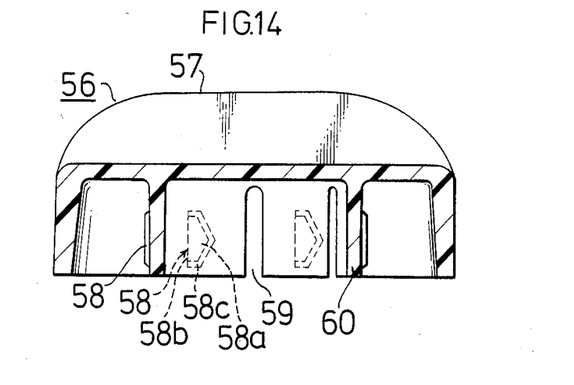
FIG. 14 is a sectional view of a lid member as shown in FIG. 11.
Figure 15:
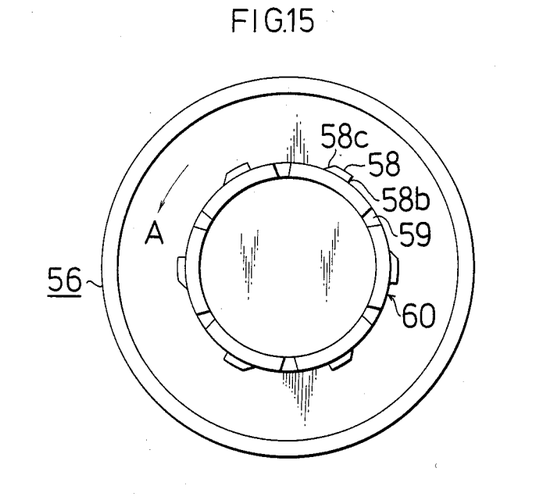
FIG. 15 is a bottom plan view of the lid member as shown in FIG. 11.

On the other hand, the cap body 56 is integrally provided at its upper portion with a knob 57 (FIG. 14) and at its lower portion with a sleeve 60. The sleeve 60 has a plurality of equispaced pentagonal projections 58 corresponding to the pentagonal recesses 55 in the inner surface of the cap body 51. Slits 59 are formed between adjacent projections 58. The projections 58 have pentagonal shape complementary to the recesses 55. Tapered surfaces 58c are formed between the triangular sections 58a of the projections 58 and the wall of the sleeve 60, so that the projections 58 can easily slip out of the recesses 55 during tightening or when any external force is applied to the lid member 56. The rear ends of the projections 58 are constituted by edges 58b perpendicular to the lid member 56.

In use, the cap body 51 and the lid member 56 are assembled together with the recesses 55 and the projections 58 engaging with each other as shown in FIG. 11, as the sleeve 60 of the lid member 56 is press-fitted to the inside of the cap body 51. When the lid member 56 is rotated in the tightening direction A, the projections 58 can easily slide on the recesses to come into and out of engagement with the same, and the sleeve 60 is contracted due to the presence of the slits 59 so that the lid member 56 remains after the fitting of the lid member in correct position. According to this arrangement, it is possible to prevent sticking or difficulty in detaching of the lid member attributable to a too strong tightening of the lid member.

When a force is applied to the lid member 56 to rotate the same in the direction opposite to the tightening direction, the vertical edges 55b and 58b of the recesses 55 and projections 58 abut each other to prevent the rotation. As this force is increased, the cap body 51 rotates as a unit with the lid member 56.

The cap of the invention, therefore, can be mounted on the filler neck 62 of the fuel tank by a predetermined tightening force. In detaching of the cap, the cap body 51 and the lid member 56 are detached as a unit from the fuel tank as the lid member is rotated in the direction opposite to the tightening direction.

Figure 16:
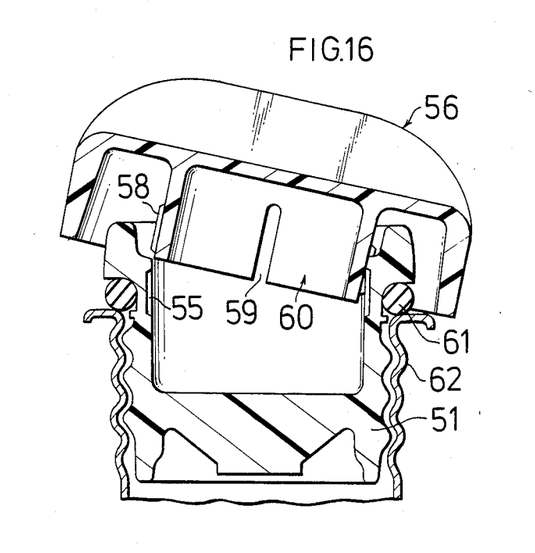
FIG. 16 is a sectional view of an essential part of the fuel tank cap in the state in which the lid member has been detached.

Assume here that an external force is applied to the lid member 56 due to a collision of the vehicle having the fuel tank cap of the invention. In such a case, the lid member 56 is easily separated from the cap body because the projections 58 and the recesses 55 are allowed to slip on each other at portions other than the rear edges 55b, 58b, i.e., at the tapered surfaces 55c and 58c. Namely, when the external force is applied to the lid member 56, the recesses 55 and the projections 58 are displaced relatively to each other and the tapered surfaces 58c of the triangular sections 58a of the projections 58 on the sleeve are disengaged from the tapered surfaces 55c of the corresponding recesses 55 in the cap body 51, so that the only lid member 56 is detached while leaving the cap body 51 securely held in the filler neck 62 without any damage of the cap body 51.

It is, therefore, possible to prevent accidental leak of the fuel out of the fuel tank and, hence, to avoid secondary accidents due to fire.

Although, in the above embodiment, the shape of the recesses and the projections is pentagonal, the present invention does not limit only this shape. That is to say, it is good enough than when a force is applied to lid member to rotate in the direction opposite to the tightening direction, the vertical edges of the recesses and the projections abut each other to prevent the rotation and also when a prescribed tightening has finished, they run idle. Therefore, the shapes of the recesses and the projections may be circular, triangular, rectangular, or polygonal.

As has been described, the fuel tank cap of the invention can be handled easily and conveniently because the cap body and the lid member are assembled together through mutual engagement between recesses and projections. In the event that a large force is applied to the cap due to, for example, collision, the cap body remains in the filler neck without fail and without any damage to prevent the leak of the fuel out of the tank, by allowing the lid member to be separated from the cap body.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A cap for a fuel tank comprising: a cap body screwed into the filler neck of said fuel tank with an "O" ring interposed therebetween, said cap body having an upper flange provided with a plurality of first coacting means; and a lid member provided in the lower side thereof with a plurality of second coacting means for mutually coacting engagement with the first coacting means said cap body, said lid member including a saucer-shaped lid having a plate-like lid flange and a side wall extending outwardly and upwardly therefrom at an angle of inclination to the plane of the lid flange; whereby said lid member is attached to said cap body only through such mutual engagement in brake-away relationship and whereby said flange side wall is exposed for detachment of said lid member from said cap body through application of external forces applied to said flange side wall due to an accident such as a collision.

2. A cap for a fuel tank according to claim 1 wherein said angle of inclination being in the range of between 30° and 45°, and whereby said lid member is detachable from said cap body by external forces applied in any direction to said side wall.

3. A cap for a fuel tank according to claim 1 wherein said flange of said cap body is provided with engaging grooves formed in the outer surface of said upper flange constituting said first coacting means, which grooves are engaged by engaging tabs of said cap member, which engaging tabs constitute said second coacting means.

4. A cap for a fuel tank according to claim 1, wherein said flange of said cap body has a central recess formed therein and including a wall having inner surface, said inner surface being provided with engaging holes constituting said first coacting means for receiving engaging tabs carried by said lid member, said engaging tabs constituting said second coacting means.

5. A cap for a fuel tank according to claim 1, wherein said flange of said cap body has an intermediate portion carrying engaging holes constituting said first coacting means for receiving engaging tabs carried by said lid member, said engaging tabs constituting said second coacting means.

* * * * *

UNITED STATES PATENT AND TRADEMARK OFFICE
CERTIFICATE OF CORRECTION

PATENT NO. : 4,579,247
DATED : April 1, 1986
INVENTOR(S) : Hiroshi Hasui et al

It is certified that error appears in the above-identified patent and that said Letters Patent is hereby corrected as shown below:

Column 8, line 11, change "brake-away" to ---break-away---.

Signed and Sealed this

Eighth Day of July 1986

[SEAL]

Attest:

DONALD J. QUIGG

Attesting Officer

Commissioner of Patents and Trademarks